(12) United States Patent
Li et al.

(10) Patent No.: US 10,173,727 B2
(45) Date of Patent: Jan. 8, 2019

(54) MULTIPLE STAGE DEFORMATION REINFORCEMENT STRUCTURE FOR IMPACT ABSORPTION

(71) Applicant: Zephyros, Inc., Romeo, MI (US)

(72) Inventors: Liwen Li, Troy, MI (US); Henry E. Richardson, Washington, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 15/656,501

(22) Filed: Jul. 21, 2017

(65) Prior Publication Data

US 2018/0029644 A1 Feb. 1, 2018

Related U.S. Application Data

(60) Provisional application No. 62/367,907, filed on Jul. 28, 2016, provisional application No. 62/395,676, filed on Sep. 16, 2016.

(51) Int. Cl.
  *B62D 21/15* (2006.01)
  *B62D 29/04* (2006.01)
  (Continued)

(52) U.S. Cl.
  CPC ............ *B62D 21/15* (2013.01); *B62D 21/157* (2013.01); *B62D 25/00* (2013.01); *B62D 29/002* (2013.01);
  (Continued)

(58) Field of Classification Search
  CPC .... B62D 21/15; B62D 21/152; B62D 21/157; B62D 25/025; B62D 25/04; B62D 29/04
  (Continued)

(56) References Cited

U.S. PATENT DOCUMENTS

| | | | |
|---|---|---|---|
| 3,984,497 | A | 10/1976 | Owens et al. |
| 3,985,703 | A | 10/1976 | Ferry et al. |

(Continued)

FOREIGN PATENT DOCUMENTS

| | | |
|---|---|---|
| DE | 19812288 C1 | 5/1999 |
| DE | 19856255 A1 | 1/2000 |

(Continued)

OTHER PUBLICATIONS

International Search Report and Written Opinion, Application No. PCT/US2017/043252 filed Nov. 10, 2017.

(Continued)

*Primary Examiner* — Jason S Daniels
(74) *Attorney, Agent, or Firm* — The Dobrusin Law Firm, P.C.; Daniela M. Thompson-Walters

(57) ABSTRACT

A structural reinforcement for a vehicle comprising: a) a carrier having a base wall from which a plurality of projections extend, the plurality of projections including at least one first projection and at least one second projection and the at least one first projection having a height greater than a height of the at least one second projection; b) an activatable material which is heat activatable and affixed to the carrier, configured to secure the carrier in a cavity of the vehicle; wherein in event of an impact, the at least one first projection and second projection are configured to deform toward the base wall and/or in a direction of an impact load in response to the impact load; and the at least one first projection is configured to receive the impact load and deform before the at least one second projection receives the impact load and deforms.

20 Claims, 8 Drawing Sheets

(51) Int. Cl.
    *B62D 25/00* (2006.01)
    *B62D 29/00* (2006.01)
    B62D 25/02 (2006.01)
    B62D 25/04 (2006.01)

(52) U.S. Cl.
    CPC ............ *B62D 29/04* (2013.01); *B62D 25/025* (2013.01); *B62D 25/04* (2013.01)

(58) Field of Classification Search
    USPC ............ 296/187.02, 187.03, 187.12, 193.06, 296/203.01
    See application file for complete search history.

(56) References Cited

U.S. PATENT DOCUMENTS

| | | |
|---|---|---|
| 4,034,013 A | 7/1977 | Lane |
| 4,096,202 A | 6/1978 | Farnham et al. |
| 4,304,709 A | 12/1981 | Salee |
| 4,306,040 A | 12/1981 | Baer |
| 4,495,324 A | 1/1985 | Chacko et al. |
| 4,536,436 A | 8/1985 | Maeoka et al. |
| 5,102,188 A | 4/1992 | Yamane |
| 5,275,853 A | 1/1994 | Silvis et al. |
| 5,464,924 A | 11/1995 | Silvis et al. |
| 5,575,526 A | 11/1996 | Wycech |
| 5,755,486 A | 5/1998 | Wycech |
| 5,766,719 A | 6/1998 | Rimkus |
| 5,884,960 A | 3/1999 | Wycech |
| 5,932,680 A | 8/1999 | Heider |
| 5,962,093 A | 10/1999 | White et al. |
| 6,058,673 A | 5/2000 | Wycech |
| 6,103,784 A | 8/2000 | Hilborn et al. |
| 6,131,897 A | 10/2000 | Barz et al. |
| 6,272,809 B1 | 8/2001 | Wycech |
| 6,348,513 B1 | 2/2002 | Hilborn et al. |
| 6,368,438 B1 | 4/2002 | Chang et al. |
| 6,378,933 B1 | 4/2002 | Schoen |
| 6,467,834 B1 | 10/2002 | Barz et al. |
| 6,478,367 B2 | 11/2002 | Ishikawa |
| 6,607,238 B2 | 8/2003 | Barz |
| 6,620,501 B1 | 9/2003 | Kassa et al. |
| 6,793,274 B2 | 9/2004 | Riley |
| 6,811,864 B2 | 11/2004 | Czaplicki et al. |
| 6,846,559 B2 | 1/2005 | Czaplicki et al. |
| 6,883,858 B2 | 4/2005 | Barz |
| 6,890,021 B2 | 5/2005 | Bock et al. |
| 6,896,320 B2 | 5/2005 | Kropfeld |
| 6,920,693 B2 | 7/2005 | Hankins et al. |
| 6,921,130 B2 | 7/2005 | Barz et al. |
| 6,932,421 B2 | 8/2005 | Barz |
| 6,935,681 B2 | 8/2005 | Hasler et al. |
| 6,941,719 B2 | 9/2005 | Busseuil et al. |
| 6,953,219 B2 | 10/2005 | Lutz et al. |
| 7,004,536 B2 | 2/2006 | Wieber |
| 7,043,815 B2 | 5/2006 | Lande et al. |
| 7,077,460 B2 | 7/2006 | Czaplicki et al. |
| 7,111,899 B2 | 9/2006 | Gray |
| 7,125,461 B2 | 10/2006 | Czaplicki et al. |
| 7,199,165 B2 | 4/2007 | Kassa et al. |
| 7,249,415 B2 | 7/2007 | Larsen et al. |
| 7,313,865 B2 | 1/2008 | Czaplicki et al. |
| 7,374,219 B2 | 5/2008 | Brennecke |
| 7,478,478 B2 | 1/2009 | Lutz et al. |
| 7,503,620 B2 | 3/2009 | Brennecke et al. |
| 7,641,264 B2 | 1/2010 | Niezur et al. |
| 7,673,930 B2 | 3/2010 | Stratman |
| 7,748,773 B2 | 7/2010 | Niezur |
| 7,926,867 B2 | 4/2011 | Kochert |
| 8,002,332 B2 | 8/2011 | Coon et al. |
| 8,020,924 B2 | 9/2011 | Niezur et al. |
| 8,047,603 B2 | 11/2011 | Goral |
| 8,361,589 B2 | 1/2013 | Kraushaar |
| 8,366,181 B2 | 2/2013 | Belpaire |
| 8,388,037 B2 | 3/2013 | LaNore et al. |
| 9,034,135 B2 | 5/2015 | Schulenburg et al. |
| 9,096,005 B2 | 8/2015 | Kanie |
| 9,592,858 B2 | 3/2017 | Kraushaar |
| 9,782,950 B2 | 10/2017 | Richardson |
| 9,895,712 B2 | 2/2018 | Buck |
| 2001/0042353 A1 | 11/2001 | Honda |
| 2002/0125739 A1 | 9/2002 | Czaplicki |
| 2003/0137162 A1 | 7/2003 | Kropfeld |
| 2004/0076831 A1 | 4/2004 | Hable et al. |
| 2004/0130185 A1 | 7/2004 | Hasler |
| 2004/0204551 A1 | 10/2004 | Czaplicki |
| 2004/0256888 A1 | 12/2004 | Le Gall |
| 2004/0262853 A1 | 12/2004 | Larsen et al. |
| 2005/0035628 A1 | 2/2005 | Behr |
| 2005/0159531 A1 | 7/2005 | Ferng |
| 2005/0212332 A1 | 9/2005 | Sheldon et al. |
| 2005/0230027 A1 | 10/2005 | Kassa |
| 2005/0268454 A1 | 12/2005 | White |
| 2005/0269840 A1 | 12/2005 | Finerman et al. |
| 2006/0008615 A1 | 1/2006 | Muteau |
| 2006/0181089 A1 | 8/2006 | Andre |
| 2007/0018483 A1 | 1/2007 | Kerscher |
| 2007/0080559 A1 | 4/2007 | Stolarski |
| 2007/0090666 A1 | 4/2007 | Brennecke |
| 2007/0095475 A1 | 5/2007 | Hable et al. |
| 2007/0096508 A1 | 5/2007 | Rocheblave et al. |
| 2008/0029200 A1 | 2/2008 | Sheasley |
| 2009/0085379 A1 | 4/2009 | Takahashi |
| 2010/0015427 A1 | 1/2010 | Belpaire et al. |
| 2010/0092733 A1 | 4/2010 | Blank et al. |
| 2010/0117397 A1 | 5/2010 | Richardson |
| 2010/0253004 A1 | 10/2010 | Lehmann et al. |
| 2011/0049323 A1 | 3/2011 | Belpaire et al. |
| 2011/0104413 A1 | 5/2011 | Mendibourne |
| 2011/0189428 A1 | 8/2011 | Belpaire et al. |
| 2011/0206890 A1 | 8/2011 | Belpaire |
| 2011/0236610 A1 | 9/2011 | Belpaire |
| 2011/0236616 A1 | 9/2011 | Belpaire |
| 2012/0141724 A1 | 6/2012 | Belpaire et al. |
| 2012/0207986 A1 | 8/2012 | Belpaire et al. |
| 2013/0133771 A1 | 5/2013 | Richardson |
| 2013/0181470 A1 | 7/2013 | LaNore et al. |
| 2013/0220418 A1 | 8/2013 | Heidtman et al. |
| 2014/0091584 A1 | 4/2014 | McConnell |
| 2015/0016737 A1 | 1/2015 | Yie et al. |
| 2015/0165737 A1 | 6/2015 | Richardson |
| 2016/0273160 A1 | 9/2016 | Braymand |
| 2017/0072887 A1 | 3/2017 | Richardson |
| 2018/0022397 A1 | 1/2018 | Richardson |
| 2018/0029328 A1 | 2/2018 | Richardson |
| 2018/0029644 A1 | 2/2018 | Li et al. |
| 2018/0037264 A1 | 2/2018 | Li et al. |
| 2018/0037272 A1 | 2/2018 | Richardson |
| 2018/0037703 A1 | 2/2018 | Richardson |

FOREIGN PATENT DOCUMENTS

| | | |
|---|---|---|
| DE | 19838955 A1 | 3/2000 |
| DE | 19858903 A1 | 6/2000 |
| EP | 1122153 A3 | 10/2003 |
| EP | 1391250 A2 | 2/2004 |
| EP | 1759959 A2 | 3/2007 |
| EP | 1759964 A1 | 3/2007 |
| EP | 1932648 A1 | 6/2008 |
| EP | 1373053 B1 | 12/2008 |
| EP | 2019027 A1 | 1/2009 |
| EP | 2117909 A1 | 11/2009 |
| EP | 2121270 A1 | 11/2009 |
| EP | 2147848 A1 | 1/2010 |
| EP | 2154052 A1 | 2/2010 |
| EP | 2159109 A1 | 3/2010 |
| EP | 2159136 A1 | 3/2010 |
| EP | 2165919 A1 | 3/2010 |
| EP | 2183150 A1 | 5/2010 |
| EP | 2238012 A1 | 10/2010 |
| EP | 2323891 A1 | 5/2011 |
| EP | 2331368 A2 | 6/2011 |
| EP | 2334540 A1 | 6/2011 |
| EP | 2337728 B1 | 6/2011 |

(56) References Cited

FOREIGN PATENT DOCUMENTS

| EP | 2463180 A1 | 6/2012 |
|---|---|---|
| EP | 2234803 B1 | 10/2012 |
| EP | 2289769 B1 | 11/2012 |
| EP | 2289771 B1 | 1/2013 |
| EP | 2553036 A1 | 2/2013 |
| EP | 2401191 B1 | 4/2013 |
| FR | 2749263 | 5/1996 |
| GB | 2421478 A | 6/2006 |
| JP | 07-031569 A | 2/1995 |
| JP | 07-117728 A | 5/1995 |
| JP | 2002-362412 A | 12/2002 |
| JP | 2003-063443 A | 3/2003 |
| WO | 00/37302 | 6/2000 |
| WO | 2002/074609 A1 | 9/2002 |
| WO | 2005/105405 A1 | 11/2005 |
| WO | 2009/080814 A1 | 7/2009 |
| WO | 2010/018190 A1 | 2/2010 |

OTHER PUBLICATIONS

Potentially Related U.S. Appl. No. 15/785,878, filed Oct. 17, 2017, published as US 2018/0037264 on Feb. 8, 2018.
Potentially Related U.S. Appl. No. 15/785,872, filed Oct. 17, 2017, published as US 2018/0037272 on Feb. 8, 2018.
Potentially Related U.S. Appl. No. 15/656,804, filed Jul. 21, 2017, published as US 2018/0022397 on Jan. 25, 2018.
International Search Report and Written Opinion for Application No. PCT/US2017/043332 dated Nov. 10, 2017.

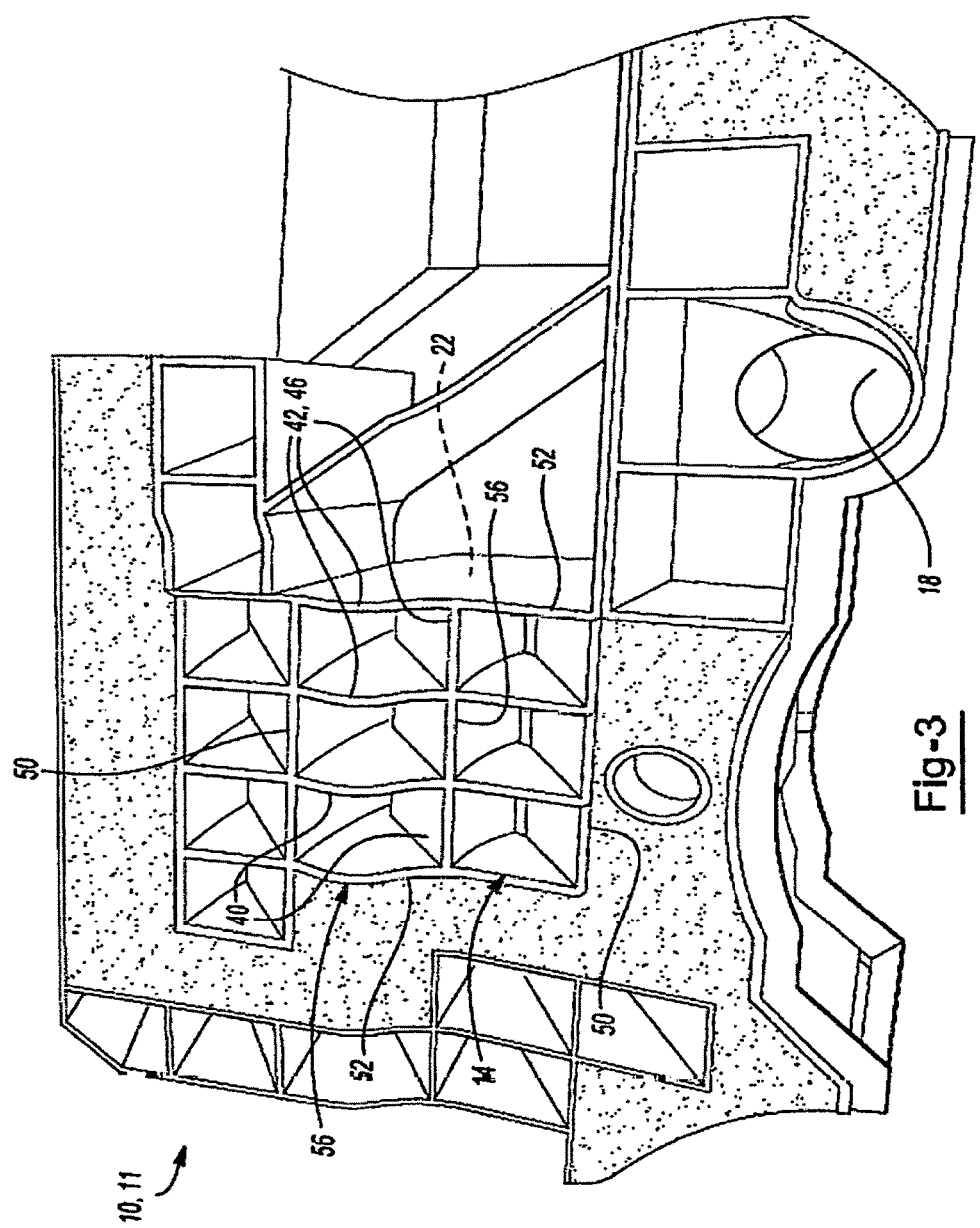

MULTIPLE STAGE DEFORMATION REINFORCEMENT STRUCTURE FOR IMPACT ABSORPTION

FIELD

The present disclosure relates generally to structural reinforcement, sealing, and/or baffling of an article, and more particularly to a structural reinforcement of an automotive vehicle which is configured to absorb and distribute an impact load in a multi-stage deformation upon impact.

BACKGROUND

In the automotive industry, there is an ongoing need for improving vehicle performance in the event of collisions or other impacts while maintaining or improving competing requirements, such as vehicle weight and fuel efficiency. One particular aspect that has been addressed is crash impact to front, rear, and/or side body panels and pillars, and preventing deformation of automotive body panels and pillars into the passenger compartment. While standard heavier metal reinforcements provide effective structural reinforcement, they result in heavier vehicles with reduced fuel efficiency. Thus, there is a need for structural reinforcements in vehicles which allow vehicles to meet crash impact requirements and continuously increasing and stricter fuel efficiency requirements.

In an ongoing effort to reduce weight and provide enhanced structural reinforcement of vehicles during crash impact, it would be attractive to have the impact load distributed in a way to cause absorption and distribution of the impact load. It would be attractive to have the impact load distributed in a way to cause a progressive collapse of a structural reinforcement, body panel, and/or pillar in a controlled manner.

SUMMARY

The present disclosure relates to a structural reinforcement for a vehicle comprising: a) a carrier having a base wall and a plurality of projections extending from the base wall, the plurality of projections including at least one first projection and at least one second projection and the at least one first projection having a height greater than a height of the at least one second projection; b) an activatable material which is heat activatable and affixed to the carrier, wherein the adhesive material is configured to secure the carrier in a cavity of the vehicle; wherein in event of an impact, the at least one first projection and the at least one second projection are configured to deform toward the base wall and/or in a direction of an impact load in response to the impact load; and the at least one first projection is configured to receive the impact load and deform before the at least one second projection receives the impact load and deforms.

The structural reinforcement of the disclosure may include one or more of the following features in any combination: the carrier may include a first portion and a second portion separated by the base wall; the at least one first projection and at least one second projection may be part of the first portion; the second portion may include at least one first projection extending from the base wall in an opposite direction as the plurality of projections of the first portion; the carrier may be a molded polymeric carrier; the molded polymeric carrier may include at least one insert made of a different material than the molded polymeric carrier; the material of the insert may have a higher yield strength than a yield strength of the molded polymeric carrier; yield strengths may be measured according to ASTM D695 and/or ASTM D790; the carrier may be a single molded one-piece structure; at least a portion of the carrier may include localized fiber reinforcement; the localized fiber reinforcement may be woven, nonwoven, or both; the activatable material may be activated by heat in an automotive vehicle painting operation (i.e., paint bake oven); the activatable material may be a structural foam, an acoustical foam, a sealant, or a combination thereof; the activatable material may expand upon activation; the activatable material may be based upon a polyolefin, an epoxy, or any combination thereof; the activatable material may be a thermoplastic and/or thermoset; a material of at least a portion of the carrier and/or the base wall may be a polyamide, a polysulfone, or both; at least one first projection may be part of a first set of a plurality of projections having a similar height; at least one second projection may be part of a second set of a plurality of projections having a similar height; the height of the at least one first projection and/or at least one second projection may be a distance from the base wall to an opposing end of the first projection; a first set of the plurality of projections and a second set of the plurality of projections may alternate relative to each other on the base wall (i.e., a first projection followed by a second projection followed by a second projection); a plurality of projections may include a pair of sidewalls opposing and distanced from one another; the plurality of projections may include a pair of end walls opposing and distanced from one another; a pair of end walls may be adjoining a pair of side walls to define a peripheral wall structure which may be generally continuous; the carrier may include at least one bridging wall which may bridge a pair of side walls, a pair of end walls, or both; the plurality of projections may include the at least one bridging wall; at least one of the first set of projections, at least one of the second set of projections, or both may form at least one of the bridging walls; the pair of side walls, a pair of end walls, at least one bridging wall may have a same height or differing height as one another; at least one of the bridging walls may have a height which is less than the height of the pair of side walls, the pair of end walls, or both; the plurality of projections may include at least one pair of intersecting projections; at least one first projection may intersect with at least one second projection; at least one of the first set of projections may intersect at least one of the second set of projections; at least one of the first set of projections may intersect at least one of the second set of projections; each individual projection of the at least one pair of intersecting projections may have different heights or same heights than each other; some of the plurality of projections may form one or more cell-like structures extending from the base wall having two or more walls, three or more walls, four or more walls, five or more walls, or any combination thereof; the plurality of projections may include one or more ribs, posts, tabs, extensions, the like, or any combination thereof; the second set of projections may be recessed compared to the first set of projections; the second set of projections may be generally parallel to one another; the second set of projections may be generally at an angle to at least some of the first set of projections, may be generally parallel to at least some of the first set of projections, or both; the deformation of the at least one first projection and/or the at least one second projection in response to the impact load may be plastic deformation; the impact load may be a force resulting from a vehicle crash or collision; the impact load may result from either side, front, or rear impact to the vehicle; at least one first projection may have a same thickness as the at least one second projection; the first set of projections may have the same thickness as the second set of projections; the deformation of the first projection and/or the second projection may include a buckling of the first projection and/or the second projection; the carrier may include a first portion adapted for outward placement in a first cavity of the vehicle; the first cavity may be proximate an outer panel of the vehicle; the carrier may include a second portion adapted for inward placement in a first cavity of the automotive vehicle, in a second cavity of the vehicle which adjoins the first cavity and is positioned inwardly in the vehicle, or both; a first cavity of the vehicle and a second cavity of the vehicle may be separated by a wall; the wall may include an opening into which the carrier is partially inserted; the opening may have an overall sectional area that is occupied by less than 80% by the carrier; and the activatable material may be heat activated.

The present disclosure relates to a method for absorbing energy in the event of an impact to a vehicle, the method comprising the steps of collapsing a carrier in a staged collapse in response to an impact load.

The method for absorbing energy may include one or more of the following features in any combination: collapsing the carrier may include a first portion of the carrier before a second portion of the carrier; at least one first projection may plastically deform before at least one second projection in response to the impact load; and at least one second projection may receive a portion of the impact load after the at least one first projection is deformed to a certain height or other pre-determined condition.

The present disclosure relates to a method for making a structural reinforcement, comprising: a) performing finite element analysis to simulate the impact load; b) generating a design of the carrier based upon the results of the finite element analysis; c) injection molding the carrier according to the design; and d) locating the activatable material onto an external surface of the carrier.

The present disclosure further relates to a method of installing a structural reinforcement into a cavity, comprising: a) disposing the structural reinforcement into the cavity or affixing the structural reinforcement to a wall of a cavity; and b) activating the activatable material so that the activatable material adheres to a surface of the cavity.

The structural reinforcement provides a carrier with a plurality of projections which cooperate with one another to absorb and distribute an impact load. The plurality of projections allow the carrier to have a multi-stage deformation and thus allow a progressive collapse of the structure reinforcement.

BRIEF DESCRIPTION OF THE DRAWINGS

FIG. 3 illustrates a second portion of a carrier of a structural reinforcement according to the teachings.

DETAILED DESCRIPTION

Figure 1:
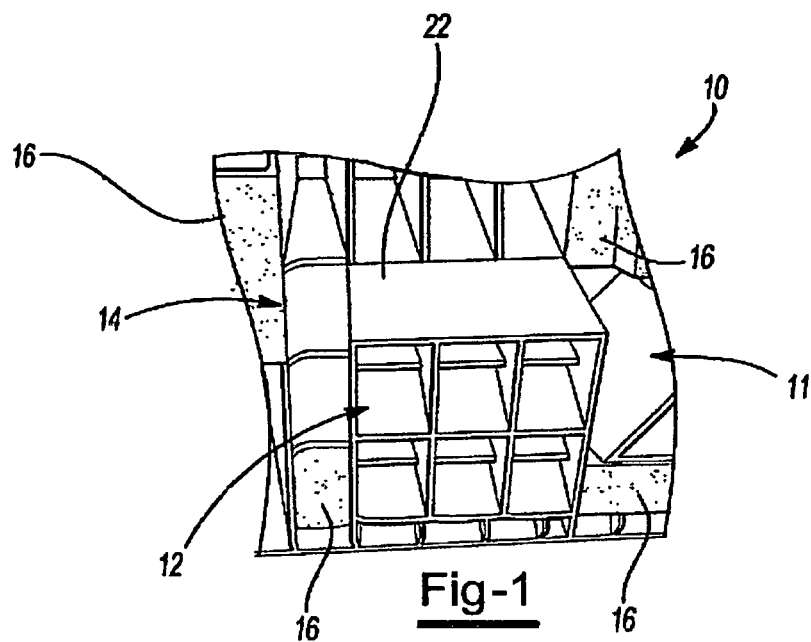
FIG. 1 illustrates a structural reinforcement according to the teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The disclosure relates to a structural reinforcement. The structural reinforcement includes a carrier. The carrier includes a base wall and a plurality of projections extending from the base wall. The plurality of projections may include at least one first projection and at least one second projection. The plurality of projections may extend at different heights from the base wall, thereby defining a plurality of deforming stages. The structural reinforcement includes an activatable material which may be configured to secure the carrier in a cavity of the vehicle. The structural reinforcement may find particular use in absorbing and/or distributing an impact load in the event of an impact, such as a crash or collision. In the event of an impact and in response to an impact load, the at least one first projection and the at least one second projection are configured to deform toward the base wall and/or in a direction of the impact load. The at least one first projection is configured to receive the impact load and deform before the at least one second projection receives the impact load and deforms. By having at least one projection deform prior to having at least one second projection deform, the energy of the impact load is able to be absorbed in stages and distributed, thus reducing the impact load transferred from an outside of the vehicle to an interior of the vehicle.

The reinforcement structure may specifically be adapted to provide sealing, baffling or reinforcement within a cavity of a vehicle. It is contemplated that the reinforcement structure may be applied (e.g., assembled) to various articles of manufacture such as boats, trains, buildings, homes, furniture, or the like. It has been found however, that the reinforcement structure is particularly suitable for application to automotive vehicles. The term "vehicle" may be used to describe any transportation vehicle, including a boat, train, automotive vehicle, plane, motorcycle, and the like.

The reinforcement structure may find particular use in absorbing impact associated with an impact load. An impact load may be understood as a force generated by impact to a surface of a vehicle, such as during a collision. The impact load may be a side impact (passenger or driver side), a rear impact, or front impact. The reinforcement structure may be useful in reinforcing a cavity in a body panel, body pillar, or crash beam. For example, the reinforcement structure may be disposed within a cavity of a B-pillar, door panel, quarter panel, dash panel, the like, or any combination thereof. The reinforcement structure may absorb and distribute impact such that at least a portion of the impact load is not transferred into the passenger compartment.

The structural reinforcement includes a carrier. The carrier may function to affix the structural reinforcement to a surface, absorb and/or distribute energy from an impact load; provide a surface of activatable material, include a plurality of projections, or any combination thereof. The carrier may have any size, shape, and/or configuration to affix the structural reinforcement to a surface, absorb and/or distribute energy from an impact load; provide a surface of activatable material, include a plurality of projections, or any combination thereof. Features part of the carrier, such as a base wall, one or more projections, or both may be integrally molded or formed from a single material. The carrier may be a one-piece structure or may be comprised of multiple pieces. The carrier may include an activatable material which may be located only onto select portions of the carrier. The carrier may include one or more portions adjacent to one another. The carrier may include a plurality of projections. The carrier may include one or more cell-like structures. The carrier may include one or more walls. The one or more walls may be formed by some or all of the plurality of projections. The carrier may include a base wall between portions or joining portions of the carrier. Carriers made in accordance with the present teachings may have a wall (i.e., base wall, plurality of projections) having a first surface and a generally opposing second surface. The wall may have a thickness ranging from about 0.2 to about 6 mm (e.g., about 1.5 to about 4 mm).

The carrier may be made of one or more materials. The one or more materials may be any material which allows the carrier to absorb and/or distribute energy from an impact load; have plastic deformation due to an impact load, transfer an impact load from a first portion to a second portion, allow the carrier to be a one-piece structure, or any combination thereof. Suitable materials for the carrier can include for example, and without limitation, a polymeric material such as nylon, polyamide, polysulfone, polyester, polypropylene, polyethylene, molding compound or the like, which may be filled or unfilled (e.g., filled with glass or kevlar reinforcement fibers); molded, extruded or otherwise-shaped metal (such as aluminum, magnesium, steel and titanium, an alloy derived from the metals, and even a metallic foam). The carrier may be formed of a thermoset or thermoplastic polymer. The carrier may comprise a composite material, a woven material, a nonwoven material, or a combination thereof. The carrier may include at least one insert made of a different material than the carrier. For example, if the carrier is a molded polymeric carrier, the insert may be made of a different material. The insert may have a higher yield strength than the molded polymeric carrier. Yield strength may be measured according to ASTM D695 and/or ASTM D790. At least a portion of the carrier may include a localized fiber reinforcement. The localized fiber reinforcement may be woven, nonwoven, or both. The carrier may also be formed of a molding compound such as a sheet molding compound (SMC), a bulk molding compound (BMC), a thick molding compound (TMC) or the like. Exemplary compositions and formation of carriers is discussed in U.S. Pat. Nos. 7,313,865; 7,503,620 and US Patent Application No. 2015/016737 which are incorporated herein by reference for all purposes.

The carrier includes at least one portion. The at least one portion may function to receive an impact load, absorb and/or distribute energy from an impact load, transfer an impact load to another portion, reduce deformation of another portion, include a plurality of projections, deform or collapse in stages, reside within an opening of cavity wall, or any combination thereof. The at least one portion may have any shape, size, or configuration to receive an impact load, absorb and/or distribute energy from an impact load, transfer an impact load to another portion, reduce deformation of another portion, include a plurality of projections, deform or collapse in stages, or any combination thereof. The carrier may include a single portion or multiple portions. One or more portions may be adjacent to one or more other portions. For example, the carrier may include a first portion adjacent to a second portion. At least one portion may be located within a same cavity or an adjacent cavity as another portion. At least one portion may receive an impact load before another portion. A portion may absorb at least some of the energy of the impact load before transferring some of the impact load to another portion. A portion may include a plurality of projections to absorb at least a portion of the impact load. At least one portion may be connected to another portion by at least one base wall. At least one portion may extend, protrude, or be adjoining another portion. One portion may have a smaller cross section than another portion. A smaller portion may cooperate with a wall of a cavity. A smaller portion may extend through a wall of a cavity. For example, when inserted into a cavity, a first portion may be inserted through an opening on one side of a wall and a second portion may reside on an opposing side of the wall. Insertion of a portion of a carrier through an opening can be found in U.S. Pat. No. 6,607,238, which is incorporated herein by reference for all purposes.

The carrier includes at least one base wall. The base wall may function to support a plurality of projections, join one or more portions of a carrier, absorb and/or distribute energy from an impact load, transfer an impact load from one portion to another portion, or any combination thereof. The base wall may have any size and/or shape to support a plurality of projections, join one or more portions of a carrier, absorb and/or distribute energy from an impact load, transfer an impact load from one portion to another portion, or any combination thereof. The wall may be generally planar or non-planar. The base wall may be integral with at least some of the plurality of projections. The base wall may have a generally uniform thickness. The thickness of the base wall may be the same or different than the thickness of one or more of the plurality of projections. The base wall may have a cross-sectional area less than, equal to, or larger than a cross-section of all or a portion of the carrier. For example, the base wall may have a cross-sectional area generally equal to a cross-sectional area of a portion of the carrier, less than a cross-sectional area of a portion of the carrier; or both. The base wall may intersect a plurality of projections. For example, the base wall may intersect a plurality of projections which extend in opposing directions.

The structural reinforcement includes a plurality of projections. The plurality of projections may function to receive and deform from an impact load, cooperate together to receive and deform at different times, plastically deform, absorb energy from the impact load, distribute the impact load, provide reinforcement to an outwardly facing wall, provide a multi-staged deformation, or any combination thereof. The plurality of projections may have any size, shape, and/or configuration to receive and deform from an impact load, cooperate together to receive and deform at different times, plastically deform, absorb energy from the impact load, distribute the impact load, provide reinforcement to an outwardly facing wall, provide a multi-staged deformation, or any combination thereof. The plurality of projections may be in the shape of ribs, posts, tabs, extensions, other protrusions from the carrier, the like, or any combination thereof. The plurality of projections may be planar or non-planar prior to deformation. The plurality of projections may have thickness, which may be the distance from one opposing surface to another opposing surface. The thickness may be the distance between two opposing surfaces generally orthogonal to the base wall. All or some of the plurality of projections may have a same or differing thickness. The plurality of projections may be made of materials suitable for the carrier. One or more projections may be made of a same or different material than one or more other projections, a base wall, or other portions of the carrier. The plurality of projections may be part of the carrier. The plurality of projections may extend from a wall of the carrier, such as the base wall. The plurality of projections may extend at any angle from the base wall. The plurality of projections may be generally orthogonal to the base wall. The plurality of projections may have projections with differing heights (i.e., distance measured from base wall to an opposing end of a projection). At least one projection with a greater height may receive an impact load and deform (i.e., plastically deform) before at least one projection with a lesser height. Deformation of the plurality of projections may include buckling, collapsing, crushing, flexing at a hinge point (i.e., where the projection extends from the base wall), the like, or any combination thereof.

The plurality of projections may have a height and width. Height may be measured as the distance from the base wall to an opposing end of the projection. Width may be measured as a distance from one end unattached to the base wall to an opposing end unattached to the base wall. The plurality of projections may have an aspect ratio of width to height. The aspect ratio may be about 1:1 or more, about 2:1 or more, about 3:1 or more, or even about 4:1 or more. The aspect ratio may be about 10:1 or less, about 8:1 or less, or even about 6:1 or less.

At least some of the plurality of projections may be porous. The pores may function to allow fluid to flow through. The pores may have any shape and/or size to allow fluid to flow through. Fluid may be defined as air, heat, e-coat fluid, the like, or any combination thereof. The pores may also provide additional weight reduction without hindering performance of the reinforcement structure.

In addition, one or more openings or spaces may be provided between any of the plurality of projections, within a wall, and/or any part of the structural reinforcement. The one or more openings or spaces may allow fluid to flow through. The fluid may flow from outside of a vehicle to the inside of the vehicle and/or vice-versa. The fluid may flow through a cavity into or out of a vehicle. The one or more openings or spaces may be placed in fluid communication with a cavity of the vehicle. The one or more openings or spaces may allow the fluid to more easily flow through the cavity having the structural reinforcement therein. At least a portion of the one or more openings or spaces may remain exposed (i.e., uncovered) by a panel, vehicle surface, cavity wall, and/or the like. The one or more openings or spaces may be located between projections, within the base wall, within or adjacent to the first portion and/or the second portion, or any combination thereof.

The plurality of projections may include at least one pair of intersecting projections. Intersecting projections may intersect generally orthogonally or obliquely. Projections which intersect may have same or differing heights as the projections which are intersected. The plurality of projections may include generally parallel projections. The at least one pair of intersecting projections may include at least one first projection and at least one second projection. The plurality of projections may include projections which are aligned, staggered, or off-set from other projections. The plurality of projections may form one or more cell-like structures. A cell-like structure may be understood as having at least two side surfaces formed by at least two projections and a base surface formed by the base wall. A cell-like structure may be open or closed. A closed cell-like structure may be formed when four projections adjoin one another at ends extending from a base wall and form a continuous wall. An open cell-like structure may be formed when two or three projections adjoin one another at ends extending from a base wall to form a partially continuous wall.

The plurality of projections include at least one first projection. The at least one first projection may function to receive and deform from an impact load before at least one second projection, absorb energy from an impact load before transferring a portion of the impact load, provide reinforcement to an outwardly facing wall, provide a first stage of deformation, or any combination thereof. The at least one first projection may be part of a first set of projections. The first set of projections may include a plurality of the at least one first projection. The at least one first projection may be part of a first set of a plurality of projections having a similar height. The at least one first projection may intersect with a second projection, another first projection, or both. The at least one first projection may have the same height or a greater height than a second projection. The at least one first projection having a greater height may allow the first projection to receive an impact load before a second projection. The at least one first projection having a greater height may allow the first projection to begin to deform from the impact load, absorb some of the impact load, before the second projection. The at least one first projection having a greater height may allow the plurality of projections to deform in a staged manner, such that the first projection deforms before the second projection and defines a first stage of deformation. It may be understood, as opposed to having a different heights to cause initial absorption and multi-staged deflection, the at least one first projection may have different material properties than the at least one second projection (i.e., elasticity, shock absorption, the like). The at least one first projection and/or first set of projections may alternate with at least one second projection and/or second set of projections.

The plurality of projections include at least one second projection. The at least one second projection may function to receive and deform from an impact load after at least one first projection, absorb energy from an impact load before transferring a portion of the impact load, provide reinforcement to an outwardly facing wall, provide a second stage of deformation, or any combination thereof. The at least one second projection may be part of a second set of projections. The second set of projections may include a plurality of the at least one second projection. The at least one second projection may be part of a second set of a plurality of projections having a similar height. The at least one second projection may intersect with a first projection, another second projection, or both. The at least one second projection and/or second set of projections may be generally parallel to one another and not intersect with another second projection. The at least one second projection may have the same height or a lesser height than a first projection. The at least one second projection having a lesser height may allow the second projection to receive an impact load after a first projection and define a second stage of deformation. The at least one second projection may be recessed compared to at least one first projection. Recessed may be defined as an exposed end of the at least one second projection which is closer to the base wall than an exposed end of the at least one first projection. The at least one second projection may have a height which is at least about 25% of the height of the at least one first projection, at least about 30% of the height of the at least one first projection; at least about 50% of the height of the at least one first projection; or even at least about 80% of the height of the at least one first projection. The at least one second projection may have a height which is equal to the height of the first projection, about 95% or less than the height of the at least one first projection, or even about 80% or less than the height of the at least one first projection.

The plurality of projections may form one or more walls. The one or more walls may cooperate together to absorb and distribute the impact load, transfer at least some of the impact load to one or more other walls, absorb a certain amount of the impact load before transferring some of the impact load to a different portion of the carrier, or any combination thereof. The one or more walls may be formed by at least one first projection, a first set of projections, at least one second projection, a second set of projections, or any combination thereof. The one or more walls may form a single cell or a plurality of cells. A plurality of projections may form a pair of sidewalls, a pair of end walls, a bridge wall, or any combination thereof. A plurality of projections may form a pair of side walls. The side walls may be opposing and distanced from one another. A plurality of projections may form a pair of end walls. The end walls may be opposing and distanced from one another. The end walls may be generally orthogonal or oblique to the side walls. The pair of end walls may be adjoining the pair of side walls. The pair of end walls and the pair of side walls may define a peripheral wall structure. The peripheral wall structure may be continuous or discontinuous. The peripheral wall may include one or more rounded corners. The one or more rounded corners may allow the structural reinforcement to be easily inserted through a cavity. For example, the rounded corners may prevent sharp corners from interfering with one or more edges of a cavity during assembly. The one or more rounded corners may be located anywhere on the carrier, such as the first portion and/or second portion. The one or more rounded corners may be formed where one or more end walls meet one or more side walls. The plurality of projections may form at least one bridging wall. A bridging wall may bridge a pair of side walls, a pair of end walls, or both. The pair of side walls, pair of end walls, one or more bridging walls may have a same or different height as one another. The bridging wall may have a height less than or equal to the height of a pair of side walls, a pair of end walls, or both.

The structural reinforcement includes an activatable material. The activatable material may function to adhere the structural reinforcement to a surface, such as a wall of cavity. The activatable material may function to provide a seal, sound mitigation, and/or structural reinforcement. The activatable material may be located anywhere on the carrier and be any suitable material which may adhere the structural reinforcement to a surface; provide a seal, sound mitigation, and/or structural reinforcement. The activatable material may be located on any portion of a carrier. The activatable material may be located on a first portion and/or second portion. The activatable material may surround a portion of the carrier. For example, the activatable material may be located about a section of the first portion of the carrier. The activatable material may be capable of activation for expansion by an external stimulus (e.g., to at least partially fill a gap or cavity) and also may be capable of curing to form an adhesive bond to at least one surface of the article. The resulting activated material may have application for imparting structural rigidity or reinforcement (i.e., it may be what is regarded as a structural foam; examples of structural foam include, without limitation, those available from L & L Products, Inc. under the names L5204, L5207, L5214, L5234, L5235, L5236, L5239, L5244, L5505, L5510, L5520, L5540, L5800, L5810 and L8514.). The resulting activated material may have application for sealing and/or noise abatement. The resulting activated material may be expanded to at least about 50%, 100%, 200%, 400%, 600%, or even 1000% of its original volume. The resulting activated material may be expanded from its original volume, but in an amount that is below about 2500%, 2000% or even below about 1500% of its original volume.

Suitable materials that may be employed for the activatable material include expandable materials and materials that do not expand. However, it is contemplated that the activatable material can be activated to form a foam. For instance, the material may be activated to form a structural foam (e.g., the material may include an epoxy ingredient). The material may be activated to form an acoustic foam. The material may be activated to flow for purposes of sealing a region within a cavity. The material may include a combination of a material that is activatable to expand and a material that is not activatable to expand.

The activatable material may be an epoxy based material such as those disclosed in U.S. Pat. Nos. 5,884,960; 6,348,513; 6,368,438; 6,811,864; 7,125,461; 7,249,415; and U.S. Patent Publication Nos. 2004/0076831, and 2008/0029200 hereby incorporated by reference. The activatable material may be a resinous generally dry to the touch or tacky and may be shaped in any form of desired pattern, placement, or thickness. The activatable material may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Exemplary thermally expandable materials are disclosed in U.S. Pat. Nos. 7,313,865; 7,125,461; and 7,199,165 incorporated by reference herein for all purposes. For example, and without limitation, the activatable material may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable activatable materials include those available from L&L Products, Inc. under the designations L7220, L2821, L1066, L205, L2010, L2105, L2108A, L2806, L2811, L4200, L4141, L4161, L4315. L5510, L5520, L5540. L5600, L5601, L7102, and L7104.

The activatable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

By way of example, the structural reinforcement may be positioned within a cavity of a transportation vehicle (e.g., an automotive vehicle) prior to coating the vehicle. The activatable material may be activated when subjected to heat during paint shop baking operations. In applications where the activatable material is a heat activated, thermally expanding material, an important consideration involved with the selection and formulation of the material comprising the activatable material is the temperature at which a material reaction or expansion, and possibly curing, will take place. For instance, in most applications, it is undesirable for the material to be reactive at room temperature or otherwise at the ambient temperature in a production line environment. More typically, the activatable material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 140° C. to about 220° C., (e.g., about 148.89° C. to about 204.44° C. (about 300° F. to 400° F.)), body and paint shop applications are commonly about 93.33° C. (about 200° F.) or slightly higher. Following activation of the activatable material, the material will typically cure. Thus, it may be possible that the activatable material may be heated, it may then expand, and may thereafter cure to form a resulting foamed material.

The structural reinforcement may include one or more fasteners. The one or more fasteners may function to affix the structural reinforcement to a surface, such as one or more walls of a cavity. The one or more fasteners may have any size, shape, or configuration to affix the structural reinforcement to a surface. The structural reinforcement may include a single fastener or a plurality of fasteners. The one or more fasteners may be integrally formed with the carrier or separately formed from the carrier. The structural reinforcement may include one or more fasteners that are located so that they correspond with openings formed in a wall. The structural reinforcement may include one or more fasteners that cooperate with one or more edges of a cavity. The one or more fasteners may include a threaded fastener, an opening for receiving a fastener, a fir tree fastener, arrowhead fastener, push pin fastener, clip fastener, a hook-like fastener, a friction-fit fastener, the like, or any combination thereof. The one or more fasteners may be located into and/or through an opening of a surface, such as a cavity wall, to affix the structural reinforcement. The one or more fasteners may receive a surface, such as a protrusion or extension from a cavity wall, to affix the structural reinforcement.

The disclosure may relate to a method for absorbing energy in the event of an impact to a vehicle. The method may include collapsing the carrier in a staged collapse in response to an impact load. Collapsing the carrier may include a first portion of the carrier collapsing before a second portion of the carrier. The first portion may collapse toward the second portion. The first portion may prevent or minimize collapsing of the second portion. During collapsing, at least one first projection may plastically deform before at least one second projection plastically deforms in response to the impact load. The at least one second projection may receive a portion of the impact load after the at least one first projection deforms to a certain height or other pre-determined condition.

While absorbing energy, the carrier may comprise a plurality of deformation stages to define a multi-stage deformation. The deformation stages may function to absorb part of the impact load and only transfer a portion of the impact load to a subsequent stage. Each deformation stage may include deforming of at least one projection until a subsequent at least one projection begins to collapse. For example, a first stage of deformation may be defined as deforming of at least a first projection upon receiving the impact load before the at least one second projection begins to deform. For example, a second stage of deformation may be defined as deforming of at least a second projection and/or continued deformation of at least one first projection upon receiving the impact load. The number of deformation stages of a portion of the carrier may be defined by the number of different projections with different heights (i.e., two different projection heights result in two deformation stages). For example, if at least one third projection extends from the carrier, having a shorter height than the at least one second projection, a third deformation stage could be defined, and so forth.

The disclosure relates to a method for making the structural reinforcement of the teachings, which is able to have a staged collapse in response to an impact load. The method may include performing finite element analysis to simulate the impact load. The finite element analysis may identify which parts of the carrier provide the most strength, which will collapse first, what portion of a carrier may prevent or reduce deformation of another portion of carrier, determine how much reinforcement (number of projections) are necessary to reach a certain crash target, the like, or any combination thereof. The method may include generating a design of the carrier and/or reinforcement structure based upon the results of the finite element analysis. The design may include the number of projections, the location of the projections relative to one another, the height, width, and length of the projections, suitable material for the carrier, the like or any combination thereof. The method may include injection molding the carrier according to the design. The method may include locating the activatable material onto an external surface of the carrier. After making the structural reinforcement, it may be installed into a cavity, such as a cavity of a vehicle.

The disclosure relates to a method of installing the structural reinforcement according to the teachings. Installing may include disposing the structural reinforcement into the cavity or affixing the structural reinforcement to a wall of a cavity. Installing may include activating the activatable material so that the activatable material adheres to a surface of the cavity.

Illustrative Embodiments

The following descriptions of the Figures are provided to illustrate the teachings herein, but are not intended to limit the scope thereof. Features of any one embodiment may be employed in another.

FIG. 1 illustrates a structural reinforcement 10. The structural reinforcement includes a carrier 11. The carrier 11 includes a first portion 12 and a second portion 14. The carrier 11 includes activatable material 16 disposed thereon. The activatable material 16 is adapted to expand outwardly to contact and adhere to one or more walls of a vehicle cavity (not shown). The structural reinforcement 10 can include one or more channels or openings 18 (as shown in FIG. 3) which serve as a pass-through for one or more automotive components (i.e., cables, wires, drain tubes). The structural reinforcement 10 can include on or more fasteners (not shown) for attaching the structural reinforcement 10 to one or more walls of a cavity. The first portion 12 is smaller than the second portion 14. The first portion 12 and the first portion 14 may reside in a same cavity (not shown) or may reside in two separate cavities which are adjoined. For example, the first portion 12 may be adapted for outward placement in a first cavity (not shown) and the first cavity may be proximate to an outer panel of the automotive vehicle. The second portion 14 may be adapted for inward placement in the same first cavity, or in a second cavity of the automotive vehicle which adjoins the first cavity and is positioned inwardly in the automotive vehicle. The carrier 11 may include a base wall 22. The first portion 12 may share or be joined to the second portion 14 by a base wall 22. The first portion 12 may extend from the second portion 14. The first portion 12 may have a small cross-sectional area than the second portion 14.

Figure 2:
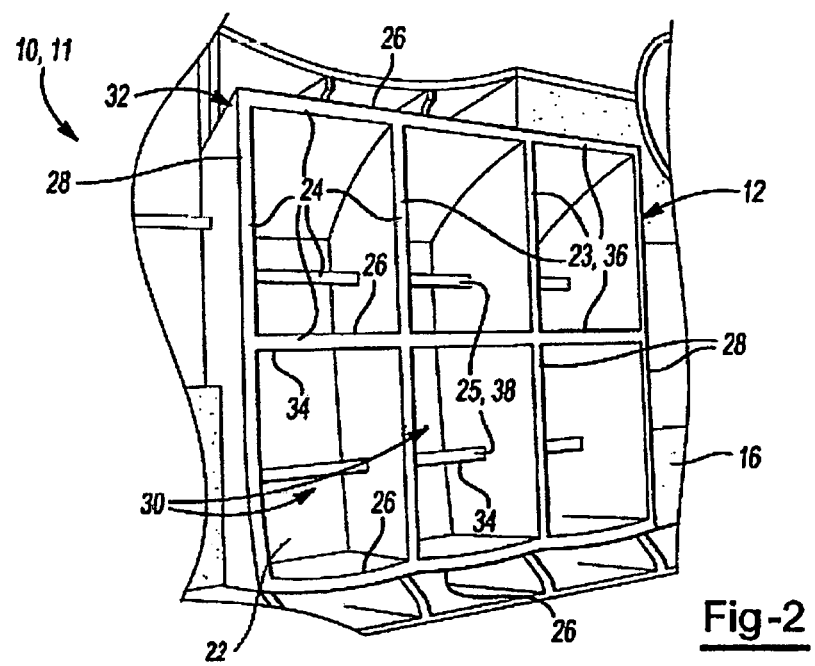
FIG. 2 illustrates a first portion of a carrier of a structural reinforcement according to the teachings.

FIG. 2 illustrates a first portion 12 of a carrier 11. The carrier 11 includes a base wall 22. Extending from the base wall 22 and opposite from the second portion 14 is a plurality of projections 24. The plurality of projections include at least one first projection 23 and at least one second projection 25. The at least one first projection 23 may extend further from the base wall 22 as the at least one second projection 25. Or in other words, the at least one second projection 25 may be recessed compared to the at least one first projection 23. The plurality of projections 24 may include a first set of projections 36, including the at least one first projection 23. The first set of projections 36 may have a height similar to the height of the at least one first projection 23. The plurality of projections 24 may include a second set of projections 38, including the at least one second projection 25. The second set of projections 38 may have a height similar to the height of the at least one second projection 25.

FIG. 2 further illustrates the plurality of projections 24 include at least one pair of opposing and distanced side walls 26. The plurality of projections include at least one pair of opposing and distanced end walls 28. The at least one pair of side walls 26 and at least one pair of end walls 28 may be adjoining one another and generally continuous. A pair of side walls 26 and a pair of end walls 28 may define one or more cell structures 30 of the carrier. A pair of side walls 26 and a pair of end walls 28 may define a peripheral wall structure 32 of the carrier 11. The plurality of projections 24 may include one or more bridging walls 34. The one or more bridging walls 34 are shown parallel to the pair of side walls 26 and joining one or more pairs of end walls 28.

FIG. 3 illustrates the second portion 14 of the carrier 11 from a rear side, opposite a face of the carrier 11 from which the first portion 12 extends. The second portion 14 is attached to the first portion 12 via a second plurality of projections 40 extending from the base wall 22. The second plurality of projections 40 extend in an opposing direction from the base wall 22 as the plurality of projections 24 of the first portion 12. The second plurality of projections 40 include at least one first projection 42. The second plurality of projections 40 may include at least one second projection 44 (not shown). The at least one first projection 42 may extend further from the base wall 22 as the at least one second projection 44 (not shown). Or in other words, the at least one second projection 44 (not shown) may be recessed compared to the at least one first projection 42. The second plurality of projections 40 may include a first set of projections 46, including the at least one first projection 42. The first set of projections 46 may have a height similar to the height of the at least one first projection 42. The second plurality of projections 40 may include a second set of projections 48 (not shown), including the at least one second projection 44 (not shown). The second set of projections 48 may have a height similar to the height of the at least one second projection 44.

FIG. 3 further illustrates the second plurality of projections 40 include at least one pair of opposing and distanced side walls 50. The plurality of projections include at least one pair of opposing and distanced end walls 52. The at least one pair of side walls 50 and at least one pair of end walls 52 may be adjoining one another and generally continuous. A pair of side walls 50 and a pair of end walls 52 may define one or more cell structures 54 of the carrier. A pair of side walls 50 and a pair of end walls 52 may define a peripheral wall structure 54 of the carrier 11. The second plurality of projections 40 may include one or more bridging walls 56. The one or more bridging walls 56 run parallel to one or more side walls 50 and connecting one or more pairs of end walls 52.

Figure 4A:
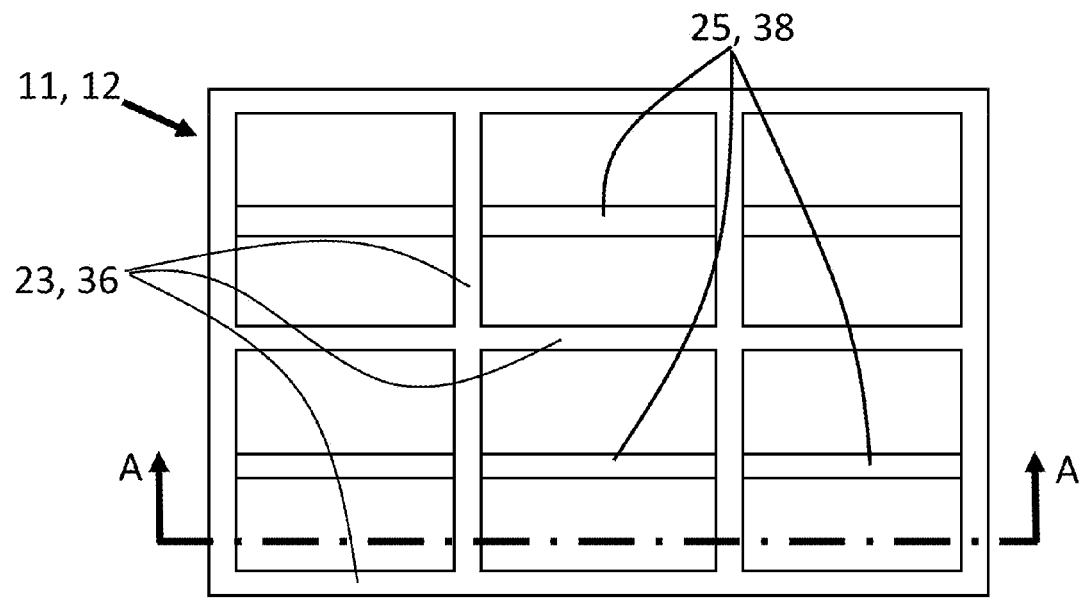
FIG. 4a illustrates a plan view of a first portion of a carrier according to the teachings.
Figure 4B:
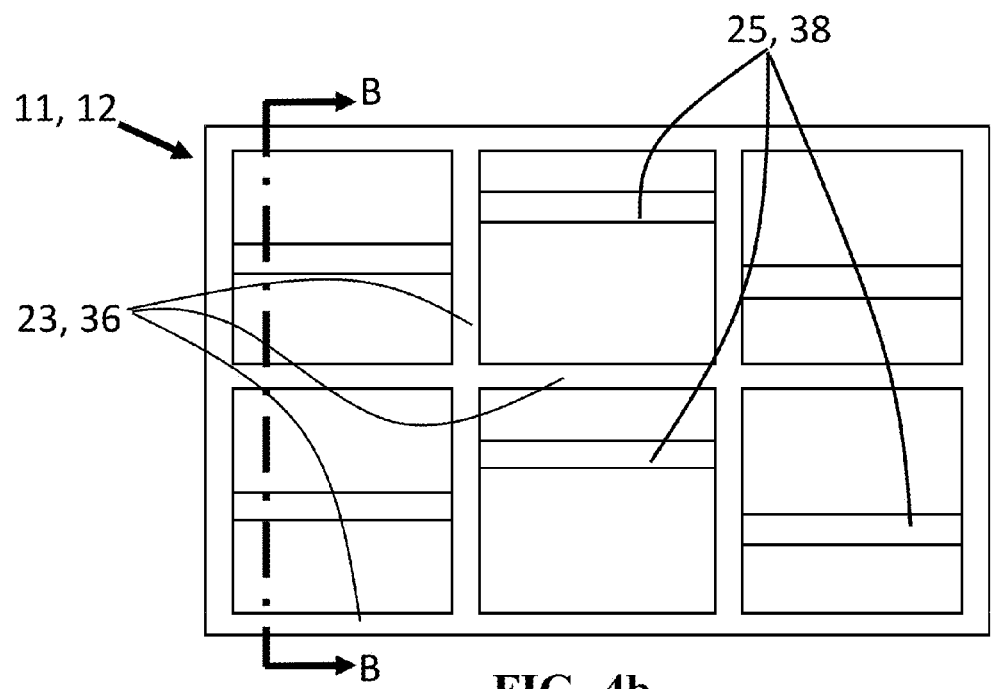
FIG. 4b illustrates a plan view of a first portion of a carrier according to the teachings.

FIGS. 4a and 4b illustrate a plan view of a first portion 12 of a carrier 11. The carrier 10 includes a first set of projections 36 and a second set of projections 38. Some of the first set of projections 36 may intersect with one another. Some of the first set of projections 36 may intersect with some of the second set of projections 38. Some of the first set of projections 36 are parallel other projections of the first set 36. The second set of projections 38 are parallel to one another. The second set of projections 38 may be aligned with at least some of the second set 38 (as shown in FIG. 4a)

and/or may be staggered or off-set with at least projections of the second set (as shown in FIG. 4b).

Figure 5A:
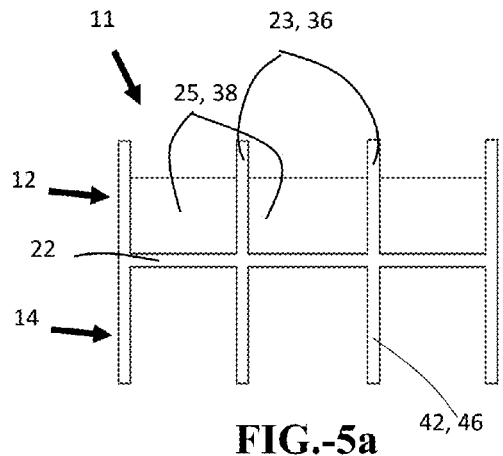
FIG. 5a illustrates a cross-section view of a carrier according to the teachings.
Figure 5B:
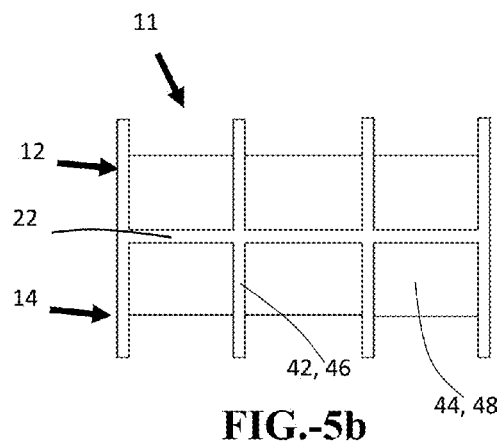
FIG. 5b illustrates a cross-section view of a carrier according to the teachings.

FIGS. 5a and 5b illustrate cross-sectional views of a carrier 11 taken along section A-A (exemplified in FIG. 4a). The at least one second projection 25 of the first portion 12 extends from the base wall 22 opposite the second portion 14. The at least one second projection 25 spans the distance between opposing first projections 23. The second portion 14 may only have a first set of projections 46 made of a plurality of first projections 42 (as shown in FIG. 5a). The first projections 42 extend away from the first portion 12. The second portion 14 may also have a second set of projections 48 extending from the base wall 22 opposite the first portion 12.

Figure 6A:
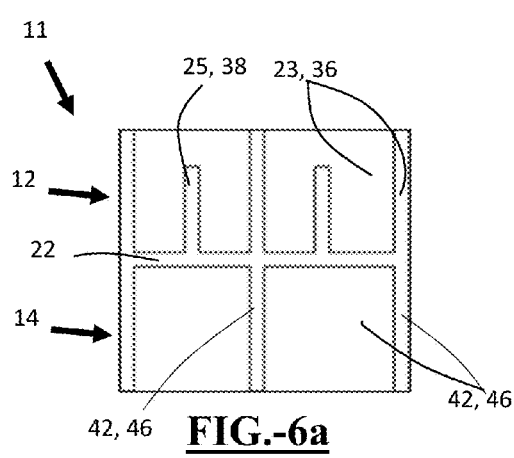
FIG. 6a illustrates a cross-section view of a carrier according to the teachings.
Figure 6B:
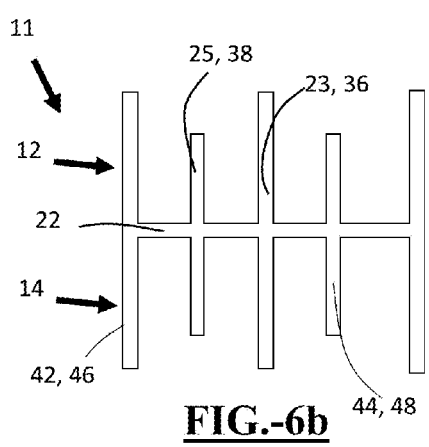
FIG. 6b illustrates a cross-section view of a carrier according to the teachings.
Figure 6C:
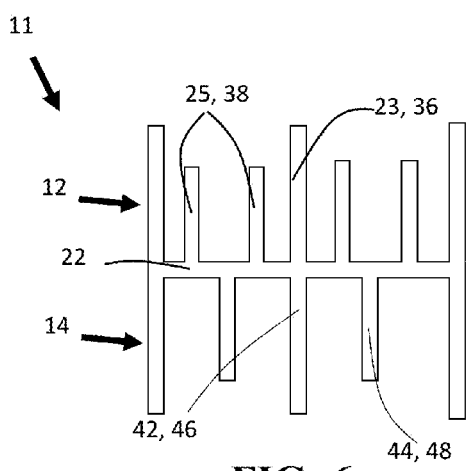
FIG. 6c illustrates a cross-section view of a carrier according to the teachings.
Figure 6D:
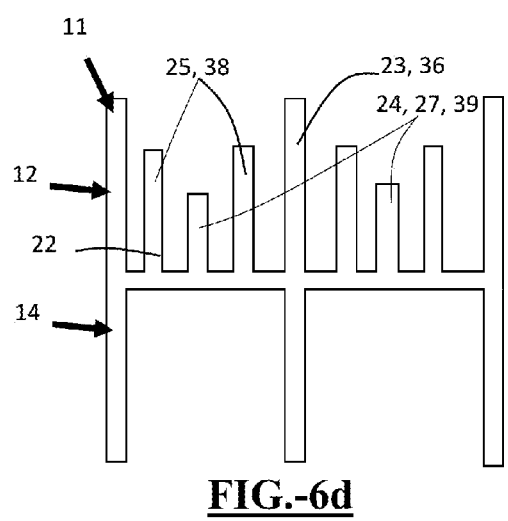
FIG. 6d illustrates a cross-section view of a carrier according to the teachings.
Figure 7:
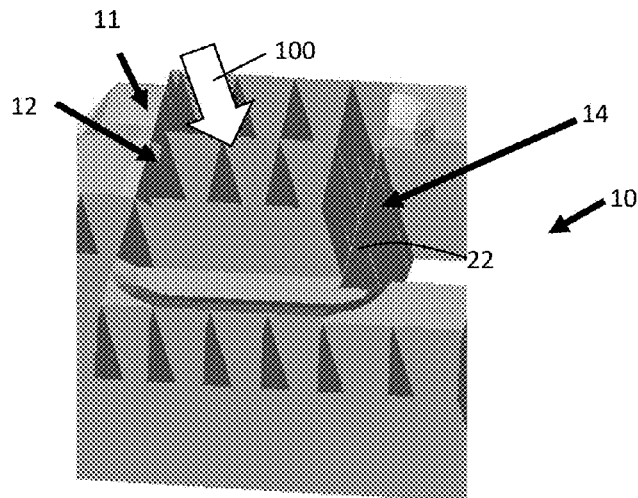
FIG. 7 illustrates a structural reinforcement according to the teachings.
Figure 8:
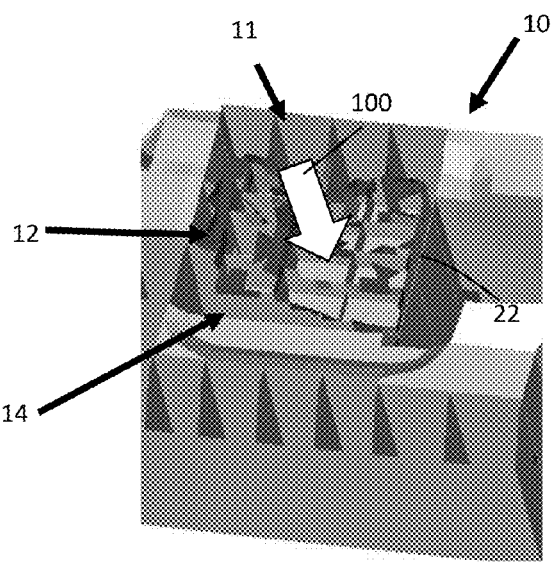
FIG. 8 illustrates an impact load deforming a first portion of a carrier according to the teachings.
Figure 9:
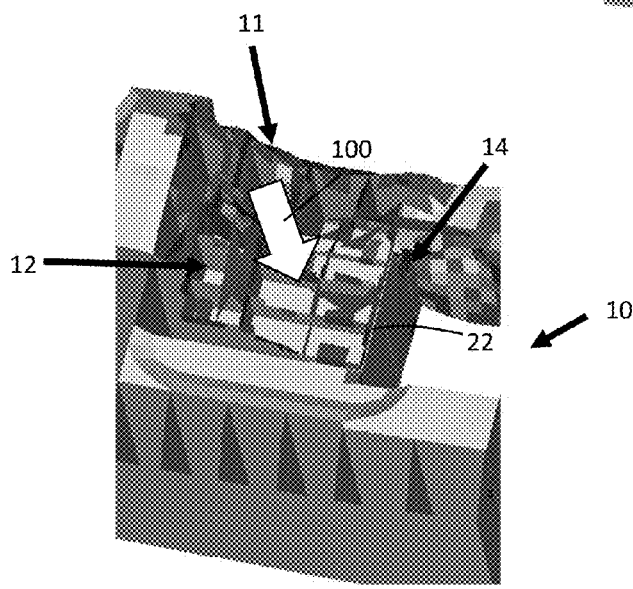
FIG. 9 illustrates an impact load deforming a first and second portion of a carrier according to the teachings.
Figure 10:
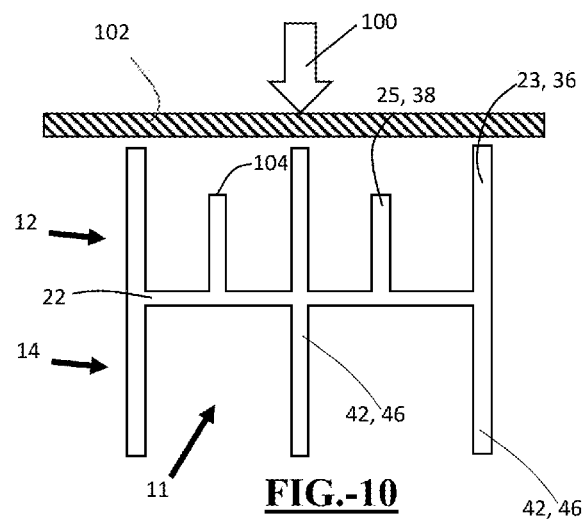
FIG. 10 illustrates a carrier receiving an impact load directed toward a base wall according to the teachings.

FIGS. 6a-6d illustrate cross-section views of the carrier 11 taken along section B-B (exemplified in FIG. 4b). The first portion 12 of the carrier 11 includes a first set of projections 36 alternating with a second set of projections 38 (as shown in FIGS. 6a-b). The first set of projections 36 and/or the second set of projections 38 may include more than one of their respective projections before alternating to the opposing set (as shown in FIG. 6c-d). The plurality of projections 40 may even include at least one projection 37 or third set of projections 39, which may have a smaller height than the second set 38. The second portion 14 of the carrier 11 may include at least a first set of projections 46. The second portion 14 of the carrier may include a second set of projections 48 (as shown in FIG. 6b-c).

Figure 11:
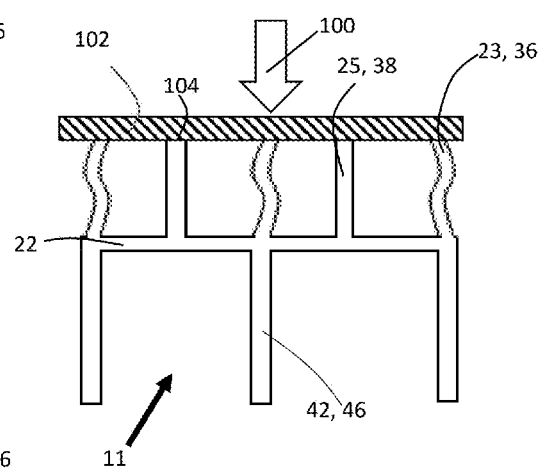
FIG. 11 illustrates a first plurality of projections of a first portion of a carrier deforming from the impact load according to the teachings.
Figure 12:
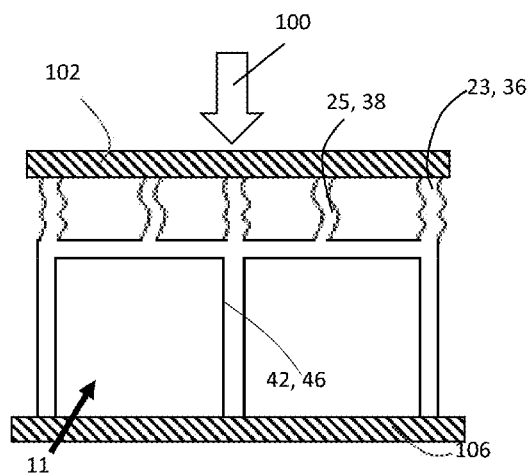
FIG. 12 illustrates a first and second plurality of projections of a first portion of a carrier deforming from an impact load according to the teachings.
Figure 13:
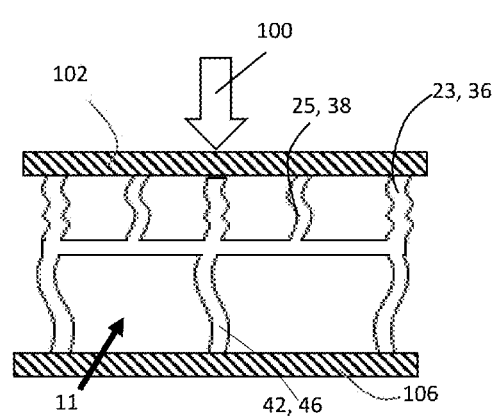
FIG. 13 illustrates an impact load transferring from the first portion to the second portion of a carrier and deforming a plurality of projections of the second portion according to the teachings.

FIGS. 7-13 illustrate the structural reinforcement 10 receiving an impact load 100, such as upon impact from a vehicle collision. The impact load 100 is first received by the first portion 12 and is generally directed toward the base wall 22. The impact load 100 may be received by an outwardly facing wall 102 of a cavity of a vehicle body. The impact load 100 results in the at least one first projection 23 and/or first set of projections 36 to begin to plastically deform (as shown in FIG. 11). As the at least one second projection 25 and/or second set of projections 38 are recessed compared to the at least one first projections and/or the first set of projections, they remain free from receiving the impact load at outwardly facing ends 104. The impact load 100 continuous to apply a force which then results in the at least one first projections 23 and/or first set of projections 36 deforming to a height from the base wall 22, that the impact load is received by the outwardly facing ends 104 of the at least one second projection 25 and/or second set of projections 38. The impact load 100 plastically deforms the at least one second projections 25 and/or second set of projections 38 and continues to plastically deform the at least one first projection 23 and/or first set of projections 36. At a predetermined distance, deformation, or other factor, the first portion 12 transfers a portion of the impact load to the second portion 14. The second portion 14 may transfer the impact load to an inwardly facing wall 106 of a cavity of a vehicle body and/or may receive a counter load from the inwardly facing wall 106 of the cavity. The second portion 14 of the carrier 11 upon receiving the impact load 100 from the first portion 12 may begin to plastically deform. For example, a second set of projections 40 may plastically deform as the structural reinforcement continues to absorb and distribute the impact load.

Figure 14:
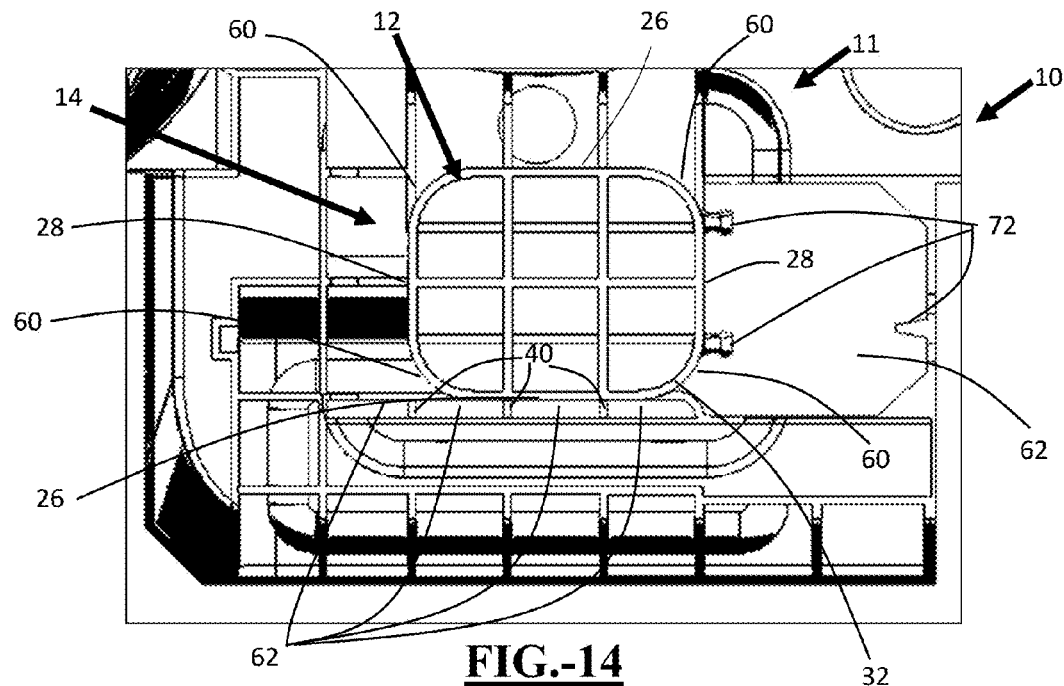
FIG. 14 illustrates a plan view of a structural reinforcement according to the teachings.

FIG. 14 illustrates a structural reinforcement 10. The structural reinforcement includes a carrier 11. The structural reinforcement 10 includes a plurality of fasteners 72 for affixing the structural reinforcement 10 into a cavity 82 (not shown). The carrier 11 includes a first portion 12 and a second portion 14. The first portion 12 of the carrier 11 includes rounded corners 60. The rounded corners 60 are formed on the peripheral wall 32 where a side wall 26 is adjacent to an end wall 28. The structural reinforcement 10 includes one or more openings 62. The one or more openings 62 are formed in the carrier 11 and can be located in the second portion 14. The one or more openings 62 can also be located adjacent the first and/or second portions 12, 14. The one or more openings 62 allow for both heat and fluid to flow through the structural reinforcement 10 during assembly and/or operation of a vehicle or panel (not shown). Some of the one or more openings 62 are formed between some of the second plurality of projections 40 of the second portion 14.

Figure 15:
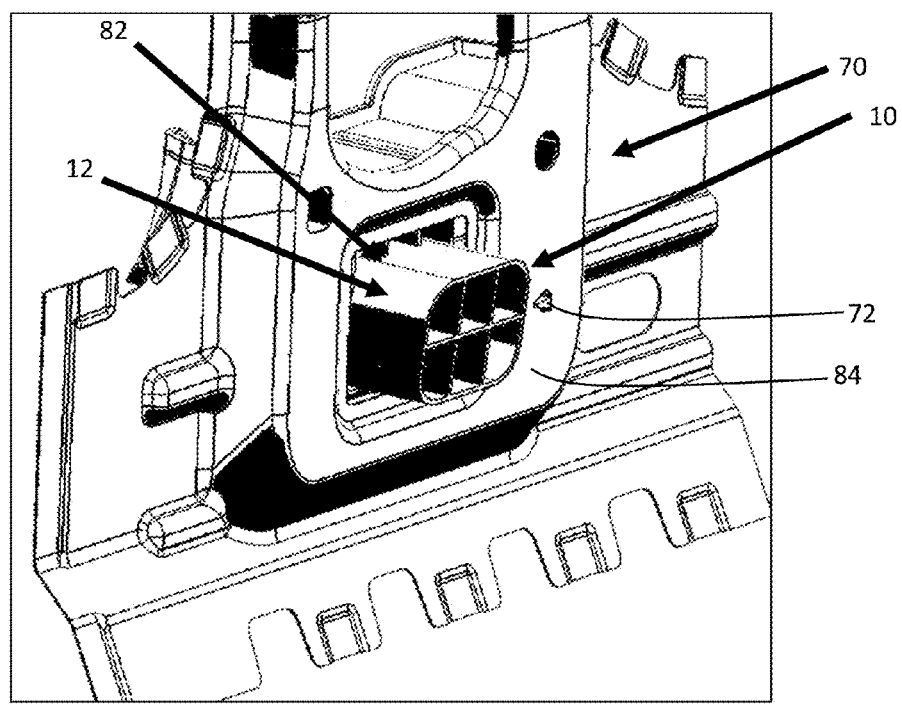
FIG. 15 illustrates a perspective view of a structural reinforcement assembled to a panel according to the teachings.
Figure 16:
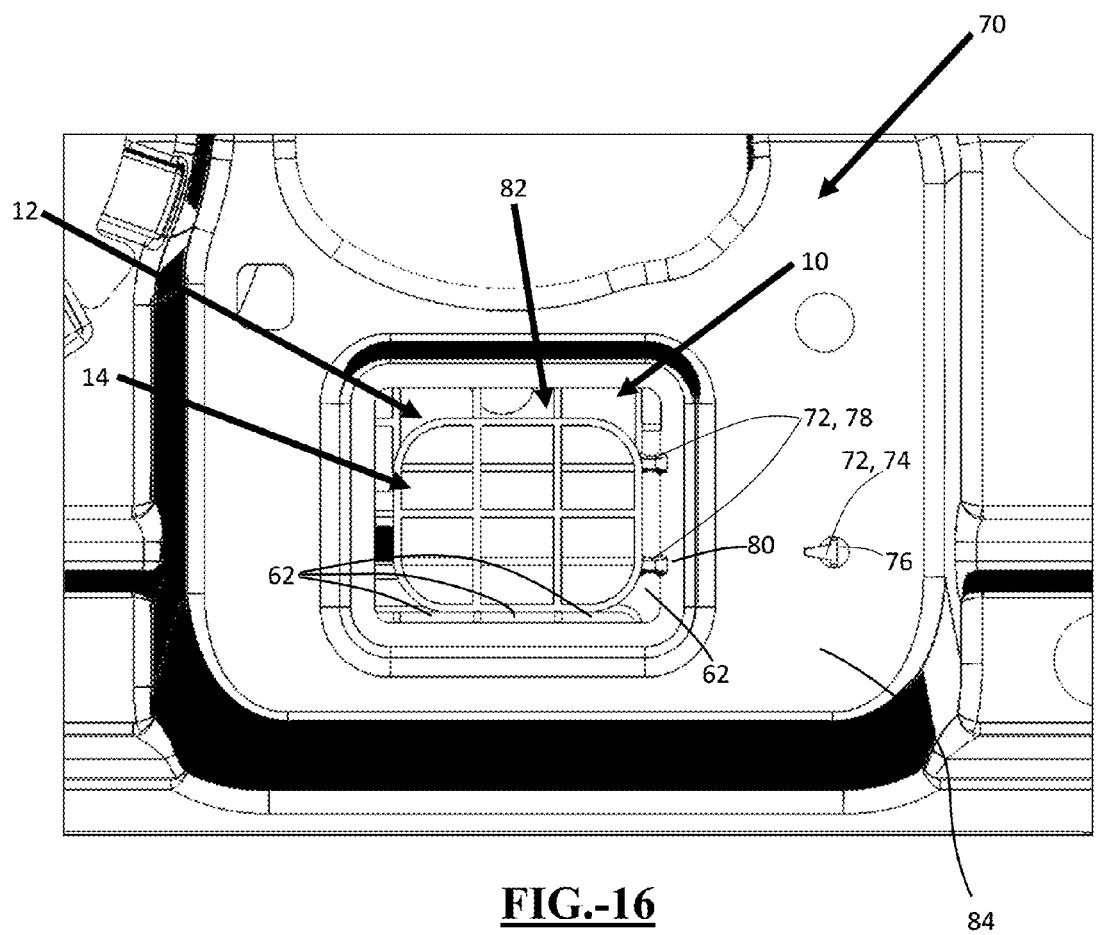
FIG. 16 illustrates a plan view of a structural reinforcement assembled to a panel according to the teachings.

FIGS. 15 and 16 illustrate a structural reinforcement 10 assembled to a panel 70 of a vehicle. The structural reinforcement 10 includes a plurality of fasteners 72. The fasteners 72 include a hooked fastener 74. The hooked fastener 74 is able to fit into a fastener opening 76 of the panel 70 and hook onto the panel 70. The fasteners 72 include two snap-fit fasteners 78. The snap-fit fasteners 78 are able to snap onto an edge surface 80 of a cavity 82. The panel 70 includes a cavity 82. The first portion 12 of the carrier 11 is inserted through the cavity 82. The first portion 12 projects beyond an exterior surface 84 of the panel 70. The snap-fit fasteners 78 extend from the first portion 12. The edge surface 80 may located between the snap-fit fasteners 72 and the second portion 12 or another portion of the carrier 11. The second portion 14 remains opposite the exterior surface 84 of the panel 70. The first portion 12 has a smaller cross-sectional area than the cavity 82. The one or more openings 62 are at least partially in fluid communication (i.e., the openings 62 remain exposed by the panel 70) with the cavity 82 so as to allow fluid to flow through the cavity 82 and the structural reinforcement 10.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A structural reinforcement for a vehicle comprising:
   a) a carrier having:
      i) base wall;
      ii) a first portion having a plurality of first projections extending from the base wall, wherein the plurality of first projections from one or more first cell-like structures extending from the base wall;
      iii) a second portion having a plurality of second projections extending from the base wall, wherein the plurality of second projections form one or more second cell-like structures extending from the base wall, and wherein the plurality of first projections have a height greater than a height of the plurality of second projections;
      iv) one or more openings passing through the base wall and located between the plurality of first projections, the plurality of second projections, or both;
   b) an activatable material affixed to the carrier and located on the second portion and located about a section of the first portion, wherein the activatable material is configured to secure the carrier in a cavity of the vehicle;
   wherein in event of an impact, the plurality of first projections and the plurality of second projections are configured to deform toward the base wall, in a direction of an impact load, or both in response to the impact load; and
   wherein the plurality of first projections are configured to receive the impact load and deform before the plurality of second projections receives the impact load and deforms.

2. The structural reinforcement of claim 1, wherein the second portion includes one or more projections extending from the base wall in an opposite direction as the plurality of first projections of the first portion.

3. The structural reinforcement of claim 1, wherein the carrier is a molded polymeric carrier.

4. The structural reinforcement of claim 3, wherein the molded polymeric carrier includes at least one insert made of a material different than the molded polymeric carrier; and
   wherein the material of the insert has a higher yield strength than a yield strength of the molded polymeric carrier.

5. The structural reinforcement of claim 1, wherein the carrier is a single molded one-piece structure.

6. The structural reinforcement of claim 1, wherein at least a portion of the carrier includes localized fiber reinforcement.

7. The structural reinforcement of claim 1 wherein the activatable material is activated by heat in an automotive vehicle painting operation; and
   wherein the activatable material is a structural foam, an acoustical foam, a sealant, or a combination thereof.

8. The structural reinforcement of claim 7, wherein the activatable material expands upon activation.

9. The structural reinforcement of claim 8, wherein the activatable material expands to about 200% or greater of an original volume to about 2500% or less of the original volume.

10. The structural reinforcement of claim 1, wherein the plurality of first projections have a similar height to one another; and
    wherein the plurality of second projections have a similar height to one another.

11. The structural reinforcement of claim 10, wherein the plurality of first projections, the plurality of second projections, or both include a pair of sidewalls opposing and distanced from one another;
    wherein the plurality of first projections, the plurality of second projections, or both include a pair of end walls opposing and distanced from one another; and
    wherein the pair of end walls are adjoining the pair of sidewalls to define a peripheral wall structure which is generally continuous.

12. The structural reinforcement of claim 10, wherein the one or more first cell-like structures and the one or more second cell-like structures extending from the base wall have four or more walls, five or more walls, or any combination thereof.

13. The structural reinforcement of claim 10, wherein the plurality of first projections, the plurality of second projections, or both include one or more ribs, posts, tabs, extensions, or any combination thereof.

14. A method for making the structural reinforcement according to claim 10 comprising:
    a) performing finite element analysis to simulate the impact load;
    b) generating a design of the carrier that has a structure according to claim 10 based upon results of the finite element analysis;
    c) injection molding the carrier according to the design; and d) locating the activatable material onto an external surface of the carrier.

15. The structural reinforcement of claim 1, wherein the deformation of the plurality of first projections, the plurality of second projections, or both in response to the impact load is plastic deformation.

16. The structural reinforcement of claim 15, wherein the deformation of the plurality of first projections, the plurality of second projections, or both includes a buckling of the plurality of first projections, the plurality of second projections, or both.

17. The structural reinforcement of claim 1, wherein the height of the plurality of first projections is measured as a distance from the base wall to an opposing end of the plurality of first projections; and
  wherein the height of the plurality of second projections is measured as a distance from the base wall to an opposing end of the plurality of second projections.

18. The structural reinforcement of claim 1, wherein the plurality of second projections include a plurality of intersecting ribs.

19. The structural reinforcement of claim 1, wherein the one or more first cell-like structures and the one or more second cell-like structures are closed cell-like structures.

20. The structural reinforcement of claim 1, wherein the second portion is adjacent to the first portion.

* * * * *